UNITED STATES PATENT OFFICE.

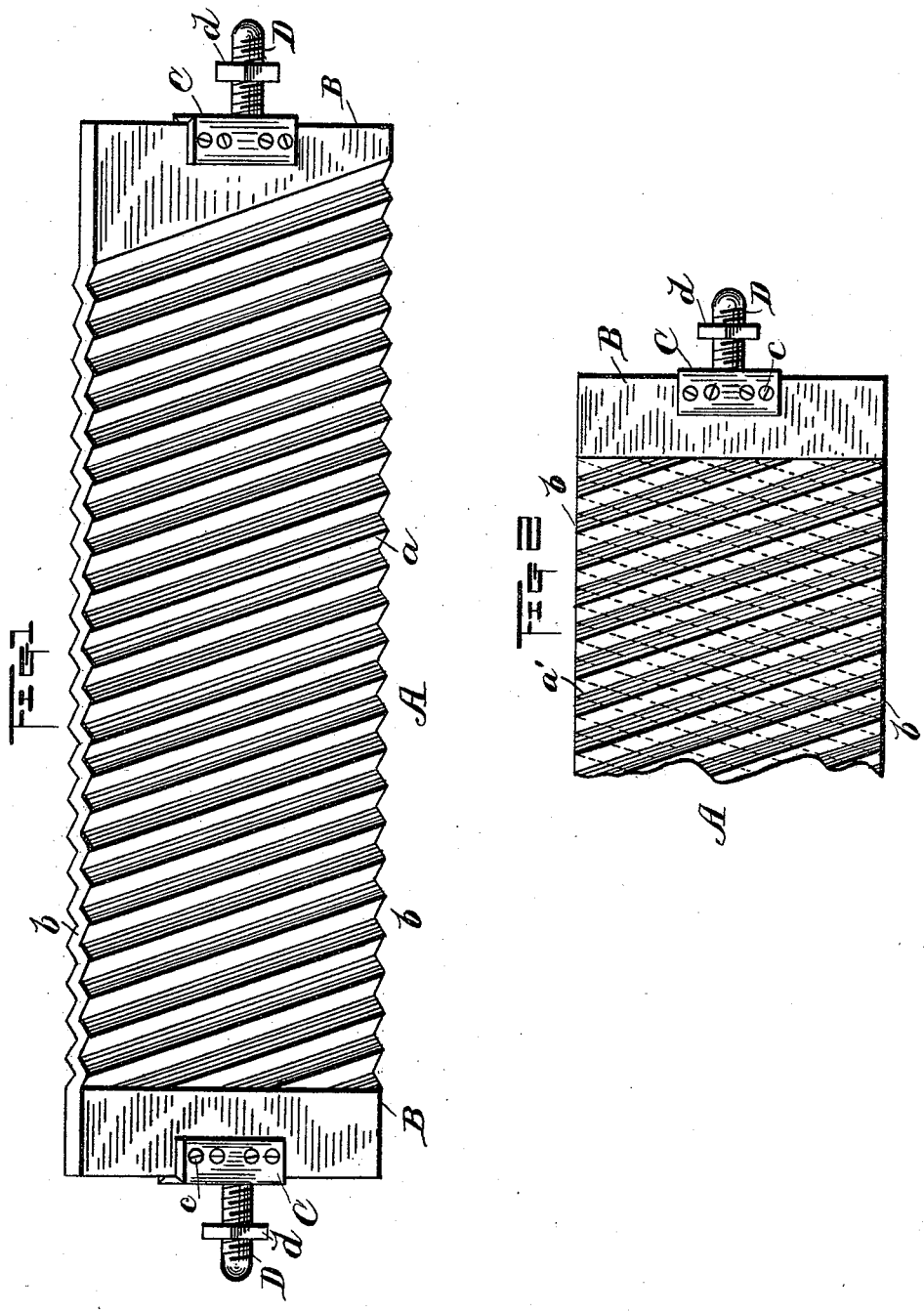

MILES LITCHFORD, OF COLUMBUS, OHIO, ASSIGNOR OF THREE-EIGHTHS TO FREDERICK A. LITCHFORD, NEIL LITCHFORD, AND WILBER JONES, OF SAME PLACE.

STONE-SAW.

SPECIFICATION forming part of Letters Patent No. 519,636, dated May 8, 1894.

Application filed September 14, 1893. Serial No. 485,490. (No model.)

*To all whom it may concern:*

Be it known that I, MILES LITCHFORD, a citizen of the United States, residing at Columbus, in the county of Franklin and State of Ohio, have invented certain new and useful Improvements in Stone-Saws; and I do hereby declare the following to be a full, clear, and exact description of the invention, such as will enable others skilled in the art to which it appertains to make and use the same.

My invention relates to improvements in saws and has to do principally with that class of saws used for cutting onyx, marble, granite and other hard stone.

Its principal objects are first, to provide an improved saw that will cut both on the forward and backward stroke. Second to so construct the saw that either edge can be used for cutting, and third to so arrange the cutting teeth or edges that abrading or cutting material can easily be fed to them from the top edge of the saw, and also to so construct the cutting edges that they will be self sharpening. I attain these objects by the devices illustrated in the accompanying drawings, in which—

Figure 1 represents a perspective view of my saw, and Fig. 2 represents a side elevation of the same, partly broken away, and showing the reverse direction of the grooves on the opposite sides by dotted lines.

The saw body A is constructed of hardened steel or other suitable material of the required strength, and is provided with diagonally arranged grooves $a, a'$ of angular, oval or square form in cross section. These grooves extend across the entire width of the saw, on both sides of the same, the grooves on one side extending in reverse direction to the grooves on the opposite side, as shown in Fig. 2. The grooves as shown in this figure are cut on the front side from left to right and on the rear side (see dotted lines) from right to left. By this construction of the grooves the saw cuts both on the forward and backward strokes, thus doing double the amount of work of an ordinary saw. The grooves being thus cut the entire width of the sides of the saw, produce two cutting edges one at the top and the other at the lower edge of the saw, and when the lower edge becomes dull from constant use, the saw can be reversed and the upper edge used to do the cutting. It will be noticed that the upper and lower cutting edges $b, b$ are flat, the cutting being done by the sharp edges at the ends of the grooves combined with cutting material such as sand which is dampened and supplied to the grooves from above and works down to the cutting edge because of the inclined direction of said grooves, which will always keep the cutting material at the point where it is needed. By this construction, the saw blade, with the sharp cutting edges or ridges extending across the entire width of the saw on both sides, there is presented but very little frictional area for coming in contact with the sides of the cut being made. By forming the grooves V-shaped in cross section as shown in the drawings, sharp oppositely inclined cutting edges are formed at each end of each groove and thus a cutting edge of each groove is presented to the stone being cut, on both the forward and the backward movement of the saw. The inclined cutting edges give a draw cut action as the cut is being made, and this action is very desirable as with it, the stone can be cut much more rapidly and with less power than is needed to operate a straight cutting edge which extends transversely to the direction in which the saw is being operated. The two ends B of the saw are not grooved but are left plain so that clamping plates C may be attached thereto by screws $c$. These plates are each provided with screw threaded lugs or projections D for receiving nuts $d$, by means of which the saw is attached to an operating mechanism. By my peculiar construction of the cutting edges proper $b, b$, the saw is self sharpening as the constant wear will only tend to grind or whet down the said cutting edges and thus sharpen them, but when these edges become nicked or broken to too great an extent it is often desirable to have them sharpened otherwise. By constructing the grooves in opposite or reverse directions on the opposite sides of the saw I secure great strength to the saw, as the hollows of the grooves when thus cut, do not coincide and thereby weaken the saw by diminishing its thickness at these points. The grooves are formed in each side to a depth sufficient only to take up less than half the thickness of the blade and thus a narrow portion along the center of the blade is not weakened at all by being cut into by said grooves. The length and breadth of the saw is of course proportionate to the class of work to be done. The saw may be actuated by steam, water, horse or hand power as most convenient according to the nature and amount of sawing to be accomplished.

What I claim as my invention is—

A stone saw provided with corrugations on both of its sides; said corrugations forming valleys and angular ridges whereby the frictional area on the sides of the saw is reduced while water and sand can be freely supplied along the entire length of the saw at all points, substantially as described.

In testimony whereof I hereunto affix my signature in presence of two witnesses.

MILES LITCHFORD.

Witnesses:
FRED A. LITCHFORD,
BENJ. MONETT.